Aug. 22, 1950      F. A. LEISEN      2,519,839
PALLET
Filed Nov. 17, 1945      2 Sheets-Sheet 1
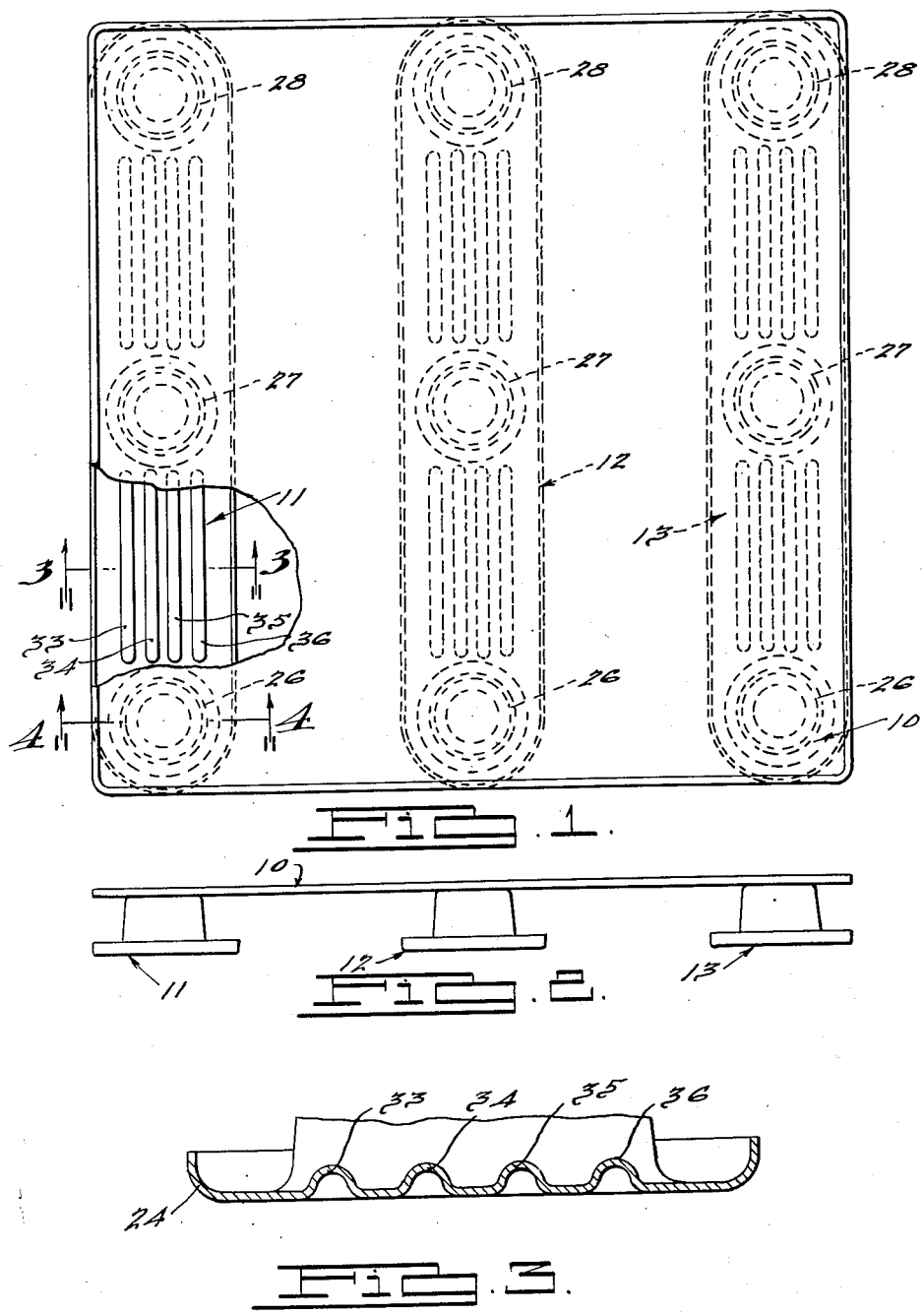
INVENTOR.
Frederic A. Leisen.
BY
Harness, Dickey & Pierce
ATTORNEYS.

Aug. 22, 1950   F. A. LEISEN   2,519,839
PALLET
Filed Nov. 17, 1945   2 Sheets-Sheet 2
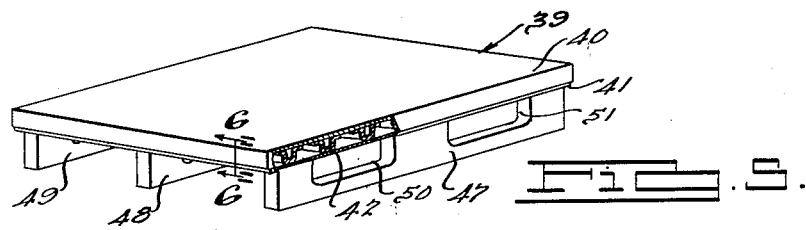
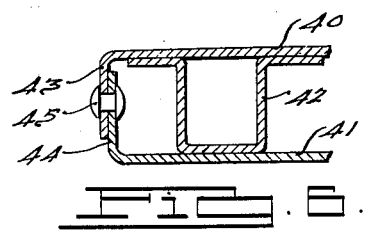
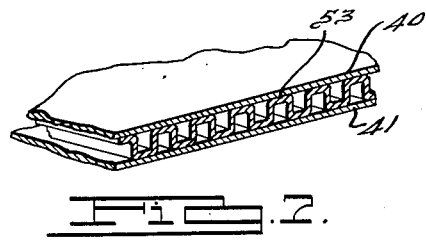
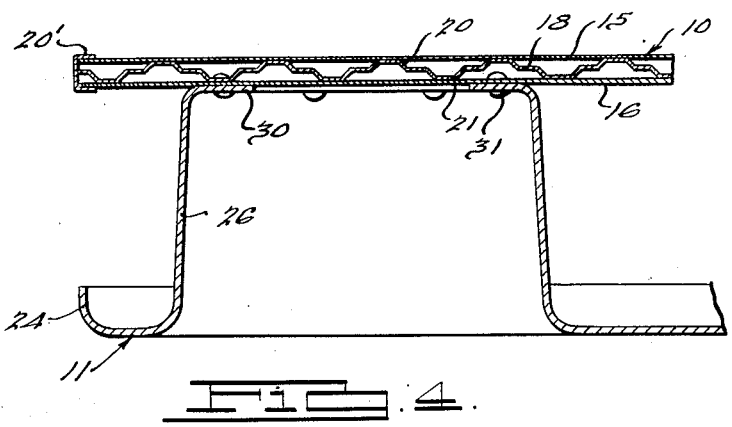
INVENTOR.
Frederic A. Leisen.
BY
Harness, Dickey & Pierce.
ATTORNEYS.

Patented Aug. 22, 1950

2,519,839

UNITED STATES PATENT OFFICE 2,519,839

PALLET

Frederic A. Leisen, Grosse Pointe Farms, Mich.

Application November 17, 1945, Serial No. 629,278

6 Claims. (Cl. 248—120)

The invention relates to the moving and storing of stock or other materials in various locations such as in a factory, and it has particular relation to a pallet adapted to be used in conjunction with a fork type truck.

At the present time the fork type truck is used rather widely in conjunction with known types of pallets for the purpose of loading, moving and storing of various materials, articles, etc. These pallets generally comprise a platform which is so supported that the forks of the truck may move under the platform from a side edge thereof and then the fork may be raised and lowered as desired in the further handling of the loaded pallet. Frequently loaded pallets are stored one upon the other and consequently, the pallet must be rigid and strong if it is to be efficient and practical. It is also desirable that the pallet be relatively light so as not only to reduce the load on the truck but also to facilitate manual handling of pallets when the pallets are moved preparatory to loading. Additional to the foregoing, it is desirable that the pallets be of such construction that they may be stacked in as small a space as possible when not in use.

One object of the present invention is to provide a pallet of lightweight construction which will be extremely strong and rugged in use.

Another object of the invention is to provide a pallet having these characteristics which may be efficiently and economically manufactured so that the cost of the pallet may be maintained as low as possible.

Another object of the invention is to provide an improved type of pallet which may be stacked easily and in a relatively small space.

Another object of the invention is to provide an improved form of pallet which is so constructed from sheet metal that great strength may be obtained with a minimum weight of metal.

Other objects of the invention will become apparent from the following specification, from the drawings relating thereto, and from the claims hereinafter set forth.

For a better understanding of the invention reference may be had to the drawings wherein:

Figure 1 is a plan view with certain parts broken away showing a pallet constructed according to one form of the invention;

Fig. 2 is an end view of the structure shown by Fig. 1;

Fig. 3 is a cross-sectional view on a larger scale taken substantially along the line 3—3 of Fig. 1;

Fig. 4 is a cross-sectional view on a larger scale taken substantially along the line 4—4 of Fig. 1;

Fig. 5 illustrates a pallet constructed according to another form of the invention;

Fig. 6 is a cross-sectional view taken substantially along the line 6—6 of Fig. 5; and Fig. 7 is a fragmentary, cross-sectional view illustrating a pallet platform constructed according to another form of the invention.

Referring to Figs. 1 and 2, the pallet comprises a platform 10 and three foot-plate elements 11, 12 and 13 which are disposed under the base in laterally spaced, parallel relation. The platform 10, as best shown by Fig. 4, includes upper and lower metal sheets or plates 15 and 16 and an intermediate sheet or plate 18 which holds the sheets 15 and 16 in spaced relation. The intermediate sheet 18, as seen in the latter figure, has upwardly and downwardly pressed out or drawn portions 20 and 21 distributed uniformly over its entire area and those portions projecting downwardly are fastened to the lower sheet 16 while those portions projecting upwardly are fastened to the upper sheet 15. One construction of intermediate sheet may comprise sheet metal which has been reenforced by passing the sheet in flat form between patterned rollers to provide what might be called a nonskid surface both at the upper side and the lower side of the sheet. For instance, each of the projections 20 and 21 may be circular or button like as seen from the top or bottom, and such circular projections are distributed over the entire area of the plate. Various other patterns may be employed such as diamond or square shaped projections, but in any case the metal is generally crimped and pressed towards opposite sides so as to greatly increase its rigidity as should be readily understood.

Such an intermediate sheet is placed between the two sheets 15 and 16 and then the three sheets are secured together by riveting, welding or other form of bonding. In order to avoid sharp edges, the sheets are connected at their margins by a channel shaped strip 29' having its legs overlapping the upper and lower sheets and welded thereto. Where riveting is employed in manufacturing the pallet and only one side of the sheets being riveted is accessible, well-known blind riveting processes may be employed which enable riveting parts from one side only. It is evident in the assembly of sheets described that the metal may be relatively thin due to the great increase in rigidity obtained.

Each of the foot-plates 11, 12 and 13, as best shown by Fig. 4, has its marginal portion upturned as indicated at 24 for the purpose of increasing the rigidity of the foot-plate and at the same time avoiding a sharp edge which might interfere with movement of the pallet. Each of the foot-plates is upwardly drawn to provide cup-like projections at three spaced points indicated at 26, 27 and 28 in Fig. 1, and as best shown by Fig. 4, each of the projections has an inwardly directed marginal flange 30 at its upper end which is riveted at circumferentially spaced points 31, to the sheet 16. A blind riveting process may be employed in effecting this riveting.

The three cups 26, 27 and 28 on the foot-plates 11, 12 and 13 are respectively transversely aligned as seen in Fig. 1 and as a result the pallet is open at both the left and right hand edges for receiving the fork of the lifting truck. It is also apparent that the pallet at the top and bottom edges is open between the foot-plates for receiving the fork of the lifting truck. Consequently the fork, may enter under the platform of the pallet from any one of its side edges. This is definitely desirable since it permits handling the pallets in any manner without regard to locating any particular side edge of the pallet in an exposed position.

Between the projections 26 and 27 and 27 and 28, each of the foot-plates is reenforced by upwardly pressing the metal to provide beads such as indicated at 33, 34, 35 and 36. This structural feature in conjunction with the cups 26, 27 and 28 and the upwardly turned margin 24 on the foot-plate provides a very strong and rigid support for the pallet platform and furthermore, this structure can be used rather roughly without danger of bending or other damage. Attention is directed to the fact that the pallets may be stacked rather easily by placing one pallet with its foot-plates disposed uppermost and then placing the next pallet with its foot-plates projecting downwardly and disposed laterally between the foot-plates on the lower pallet. Alternating pallets in any stack therefore, would have their foot-plates projecting upwardly between the foot-plates of the other pallets.

In the construction shown by Fig. 5, the platform of the pallet indicated at 39 includes an upper sheet 40, a lower sheet 41 and a series of channels 42 disposed in parallel spaced relation between the sheets. These channels may be riveted or otherwise secured to the two sheets. As seen in Fig. 6, the sheets are held in assembled relation by turning down a marginal portion 43 on the upper sheet 40 and turning upwardly a marginal portion 44 on the lower sheet 41 and riveting these two overlapping marginal portions together at spaced points as indicated at 45. A blind riveting process also may be used for effecting this riveting operation. The foot supports in this form of the invention may comprise elongated beam-like members 47, 48 and 49 having openings 50 and 51 so that the fork of the lifting truck may be inserted crosswise of the beams. It will be noted that the beams are disposed crosswise of the channels 42 in the base 39 so as to provide for rigidity of construction. The beams 47, 48 and 49 may be secured to the plate 41 in any suitable manner such as by welding or riveting.

In the construction shown by Fig. 7, the platform of the pallet instead of having channels 42 has a corrugated intermediate sheet 53 which is fastened between the upper and lower sheets 40 and 41. This type of platform may be employed in a construction such as shown by Fig. 1 if found desirable and also if found desirable, the channels 42 may be used in place of the intermediate sheet 18 in Fig. 1. Additionally instead of using a separate channel strip 20' at the edge of the platform in the structure shown by Fig. 1, the upper and lower sheets 15 and 16 may be secured at their margins in the same manner as the sheets 40 and 41 as seen in Fig. 6.

Although more than one form of the invention has been illustrated and described in detail, it will be apparent to those skilled in the art that various modifications may be made without departing from the scope of the claims.

What is claimed is:

1. In a pallet for use in conjunction with a fork type lifting truck, a horizontal platform for engaging the load, means for supporting the platform comprising three parallel sheet metal plate elements disposed under the platform in horizontally spaced relation, and means connecting the elements to the platform and providing openings for receiving the forks of the truck, said means comprising upwardly pressed portions on the plate elements located in spaced relation along their length so as to provide fork receiving openings both crosswise of the plate elements and also lengthwise between them.

2. In a pallet for use in conjunction with a fork type lifting truck, a horizontal load engaging platform comprising upper and lower spaced, horizontal metal plates, an intermediate metal plate between the first plates and having its body provided with projecting portions some of which extend upwardly and others downwardly into engaging relation with said upper and lower plates respectively, means for supporting the platform comprising parallel sheet metal plate elements disposed under the platform in horizontally spaced relation, and means connecting the elements to the platform and providing openings for receiving the forks of the truck, said means comprising upwardly pressed or drawn portions on the plate elements located in spaced relation along their length so as to provide fork receiving openings both crosswise of the plate elements and also lengthwise between them.

3. In a pallet for use in conjunction with a fork type lifting truck, a horizontal load engaging platform comprising horizontal metal plates disposed in laminated relation, one of said plates being formed with reenforcing pressed out portions engaging the other, means for supporting the platform comprising parallel sheet metal plate elements disposed under the platform in horizontally spaced relation, and means connecting the elements to the platform and providing openings for the forks of the truck, said means comprising upwardly pressed or drawn portions on the plate elements located in spaced relation along their length so as to provide fork receiving openings both crosswise of the plate elements and also lengthwise between them.

4. In a pallet for use in conjunction with a fork type lifting truck, a horizontal load engaging platform comprising metal plates disposed in vertically spaced relation, an open web metal structure between the plates and connecting them, and means for supporting the platform and comprising a lower plate means having upwardly pressed or drawn portions secured to the platform and so located as to provide fork receiving openings between them.

5. In a pallet for use in conjunction with a fork type lifting truck, a horizontal load-engaging platform, a plurality of elongated, parallel and horizontally spaced plate elements disposed below the platform, each of said plate elements having spaced, upwardly drawn portions substantially of inverted cup shape, and means operatively securing the base portions of the cups to the under side of the platform, said cup shaped portions on each of the plate elements being spaced longitudinally of the plate elements so as to provide spaces for receiving the fork of the truck.

6. In a pallet for use in conjunction with a fork type lifting truck, a horizontal load-engaging platform, comprising upper and lower plates with one of the plates provided with vertically projecting portions, some of which extend upwardly and others downwardly, with certain of the portions in contact with the other plate, means connecting the two plates so as to provide a rigid platform, means for supporting the platform comprising a plurality of elongated, parallel and horizontally spaced plate elements disposed under the patform, each of said plate elements having spaced portions drawn upwardly into inverted cup shape, and means operatively securing the platform to the bases of the inverted cups, said cup portions being spaced longitudinally of the plate elements so as to provide spaces for receiving the fork of the truck.

FREDERIC A. LEISEN.

REFERENCES CITED

The following references are of record in the file of this patent:

UNITED STATES PATENTS

| Number | Name | Date |
| --- | --- | --- |
| 1,508,183 | Hallowell | Sept. 9, 1924 |
| 1,816,350 | Thompson | July 28, 1931 |
| 2,148,150 | Clark | Feb. 21, 1939 |
| 2,372,055 | Braun | Mar. 20, 1945 |
| 2,388,730 | Fallert | Nov. 13, 1945 |